United States Patent
Jayachandran et al.

(10) Patent No.: US 12,455,967 B2
(45) Date of Patent: Oct. 28, 2025

(54) DATA STORAGE DEVICE AND METHOD FOR USING A DYNAMIC FLOATING FLASH REGION TO SECURE A FIRMWARE UPDATE

(71) Applicant: Western Digital Technologies, Inc., San Jose, CA (US)

(72) Inventors: Anusuya Jayachandran, Bengaluru (IN); Senthil Kumar Veluswamy, Bengaluru (IN)

(73) Assignee: Western Digital Technologies, Inc., San Jose, CA (US)

( * ) Notice: Subject to any disclaimer, the term of this patent is extended or adjusted under 35 U.S.C. 154(b) by 152 days.

(21) Appl. No.: 18/225,813

(22) Filed: Jul. 25, 2023

(65) Prior Publication Data

US 2024/0378293 A1  Nov. 14, 2024

Related U.S. Application Data

(60) Provisional application No. 63/465,589, filed on May 11, 2023.

(51) Int. Cl.
  *G06F 21/57*   (2013.01)
  *G06F 8/654*   (2018.01)
  *G06F 12/02*   (2006.01)
  *G06F 12/14*   (2006.01)

(52) U.S. Cl.
  CPC .......... *G06F 21/572* (2013.01); *G06F 8/654* (2018.02); *G06F 12/1408* (2013.01); *G06F 2212/1052* (2013.01); *G06F 2212/2022* (2013.01); *G06F 2221/033* (2013.01)

(58) Field of Classification Search
  CPC .... G06F 21/572; G06F 8/654; G06F 12/1408; G06F 2212/1052

USPC .......................................................... 726/22
See application file for complete search history.

(56) References Cited

U.S. PATENT DOCUMENTS

| | | | |
|---|---|---|---|
| 5,579,522 A * | 11/1996 | Christeson | G06F 11/1433 713/2 |
| 9,128,822 B2 * | 9/2015 | Michael | G06F 3/0679 |
| 9,558,009 B1 * | 1/2017 | Choi | G06F 9/4403 |
| 9,727,258 B1 * | 8/2017 | Nazarian | G11C 16/0483 |

(Continued)

FOREIGN PATENT DOCUMENTS

| | | |
|---|---|---|
| KR | 20230004133 A | 1/2023 |
| WO | WO 2014/088239 A1 | 6/2014 |

OTHER PUBLICATIONS

Dr. Helena Handschuh; Securing Flash Technology; IEEE: Year:2007; pp. 1-15.*

*Primary Examiner* — Monjur Rahim
(74) *Attorney, Agent, or Firm* — Crowell & Moring LLP

(57) ABSTRACT

A data storage device and method are provided for using a dynamic floating flash region to secure a firmware update. In one embodiment, a data storage device is provided comprising a first non-volatile memory, a second non-volatile memory, and a controller. The controller is configured to communicate with the first and second non-volatile memories and further configured to: determine addresses in the second non-volatile memory to store portions of a firmware update, wherein the addresses are determined on-the-fly as opposed to being predetermined; and store the portion of the firmware update in the addresses in the second non-volatile memory. Other embodiments are provided.

18 Claims, 10 Drawing Sheets

(56) References Cited

U.S. PATENT DOCUMENTS

| | | | | |
|---|---|---|---|---|
| 9,742,568 | B2* | 8/2017 | Rao | G06F 8/654 |
| 9,880,859 | B2* | 1/2018 | Swanson | G06F 9/4416 |
| 10,552,604 | B2* | 2/2020 | Buer | G06F 21/53 |
| 10,719,400 | B2* | 7/2020 | Rahardjo | G06F 11/1469 |
| 2013/0346671 | A1* | 12/2013 | Michael | G06F 3/0679 |
| | | | | 711/E12.008 |
| 2014/0122777 | A1* | 5/2014 | Oh | G06F 3/061 |
| | | | | 711/103 |
| 2016/0019050 | A1* | 1/2016 | Marr | H04L 63/20 |
| | | | | 717/172 |
| 2018/0046585 | A1* | 2/2018 | Okhravi | G06F 12/023 |
| 2018/0225459 | A1* | 8/2018 | Zarakas | G06F 21/77 |
| 2019/0042404 | A1* | 2/2019 | Subramanian | G06F 12/0246 |
| 2020/0257518 | A1* | 8/2020 | Liedtke | G06F 8/65 |
| 2024/0073058 | A1* | 2/2024 | Kazimirsky | G06F 9/544 |
| 2024/0118736 | A1* | 4/2024 | Hassan | G06F 1/3275 |
| 2024/0378293 | A1* | 11/2024 | Jayachandran | G06F 21/572 |

* cited by examiner

| SPI Flash address | Region |
|---|---|
| 0x0000 | Data |
| 0x1000 | FW image 0 |
| 0x2000 | FW image 1 |
| 0x3000 | FW image 2 |
| 0x4000 | Logs |
| • | • |
| • | • |
| • | • |
| 0xn000 | • |

FIG. 6

DATA STORAGE DEVICE AND METHOD FOR USING A DYNAMIC FLOATING FLASH REGION TO SECURE A FIRMWARE UPDATE

CROSS-REFERENCE TO RELATED APPLICATION

This application claims priority to U.S. provisional patent application No. 63/465,589, filed May 11, 2023, which is hereby incorporated by reference.

BACKGROUND

A data storage device can store its firmware in a relatively-small non-volatile memory (e.g., a Serial Peripheral Interface (SPI) flash memory) that is separate from the non-volatile mass-storage memory and the controller of the data storage device. If a hacker discovers the location in the SPI flash memory that stores the firmware, the hacker can download a corrupted firmware file into that location.

BRIEF DESCRIPTION OF THE DRAWINGS

FIG. 6 is an illustration of a layout of a Serial Peripheral Interface (SPI) flash device of an embodiment.

DETAILED DESCRIPTION

Figure 1A:
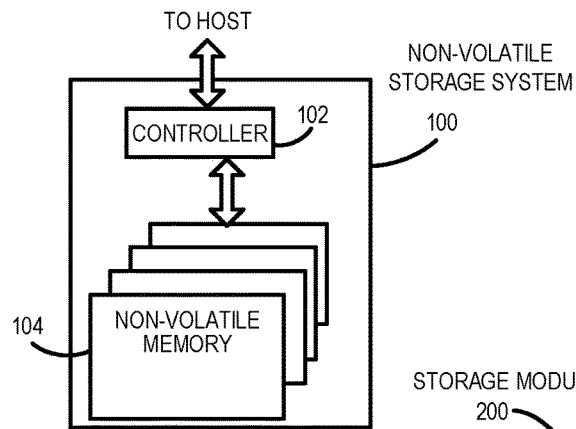
FIG. 1A is a block diagram of a data storage device of an embodiment.

The following embodiments generally relate to a data storage device and method for using a dynamic floating flash region to secure a firmware update. In one embodiment, a data storage device is provide comprising a first non-volatile memory, a second non-volatile memory, and a controller. The controller is configured to communicate with the first and second non-volatile memories and further configured to: determine addresses in the second non-volatile memory to store portions of a firmware update, wherein the addresses are determined on-the-fly as opposed to being predetermined; and store the portion of the firmware update in the addresses in the second non-volatile memory.

In some embodiments, the portions of the firmware update are stored in a linked fashion such that an address of a given portion of the firmware update is stored in a previous portion of the firmware update and a first address of the firmware update in stored in a configuration file.

In some embodiments, the first address is encrypted.

In some embodiments, a number of the portions of the firmware update is determined based on a size and/or layout of the second non-volatile memory.

In some embodiments, the controller is further configured to: store at least one additional portion of the firmware update in at least one additional non-volatile memory.

In some embodiments, the controller is further configured to: determine whether the firmware update was successfully stored; and in response to determining that the firmware update was successfully stored, deallocate locations in the second non-volatile memory that store a previous firmware version.

In some embodiments, the controller is further configured to: in response to determining that the firmware update was not successfully stored, deallocate locations in the second non-volatile memory that were allocated to store the firmware update and invalidate a first address stored in a configuration file.

In some embodiments, a storage capacity of the second non-volatile memory is less than a storage capacity of the first non-volatile memory In some embodiments, the second non-volatile memory comprises a Serial Peripheral Interface (SPI) flash memory device.

In some embodiments, the first non-volatile memory comprises a three-dimensional memory.

In another embodiment, a method is provided that is performed in a data storage device comprising a first non-volatile memory and a second non-volatile memory. The method comprises: dynamically determining addresses in the second non-volatile memory to store portions of firmware; and storing the portion of the firmware in the dynamically-determined addresses in the second non-volatile memory.

In some embodiments, the portions of the firmware are stored in a linked fashion such that an address of a given portion of the firmware is stored in a previous portion of the firmware and a first address of the firmware in stored in a configuration file.

In some embodiments, the first address is encrypted.

In some embodiments, a number of the portions of the firmware is determined based on a size and/or layout of the second non-volatile memory.

In some embodiments, the method further comprises storing at least one additional portion of the firmware in at least one additional non-volatile memory.

In some embodiments, the method further comprises determining whether the firmware was successfully stored; and in response to determining that the firmware was successfully stored, deallocating locations in the second non-volatile memory that store a previous firmware version.

In some embodiments, the method further comprises in response to determining that the firmware was not successfully stored, deallocating locations in the second non-volatile memory that were allocated to store the firmware and invalidating a first address stored in a configuration file.

In some embodiments, a storage capacity of the second non-volatile memory is less than a storage capacity of the first non-volatile memory.

In some embodiments, the second non-volatile memory comprises a Serial Peripheral Interface (SPI) flash memory device.

In another embodiment, a data storage device is provided comprising: a mass storage memory; a Serial Peripheral Interface (SPI) flash memory device; and means for storing a firmware update in dynamic floating flash regions in the SPI flash memory device.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
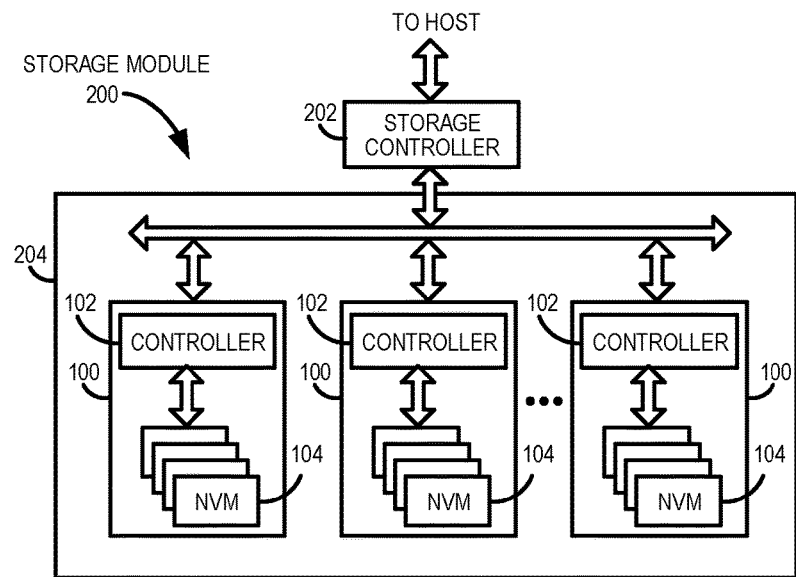
FIG. 1B is a block diagram illustrating a storage module of an embodiment.
Figure 1C:
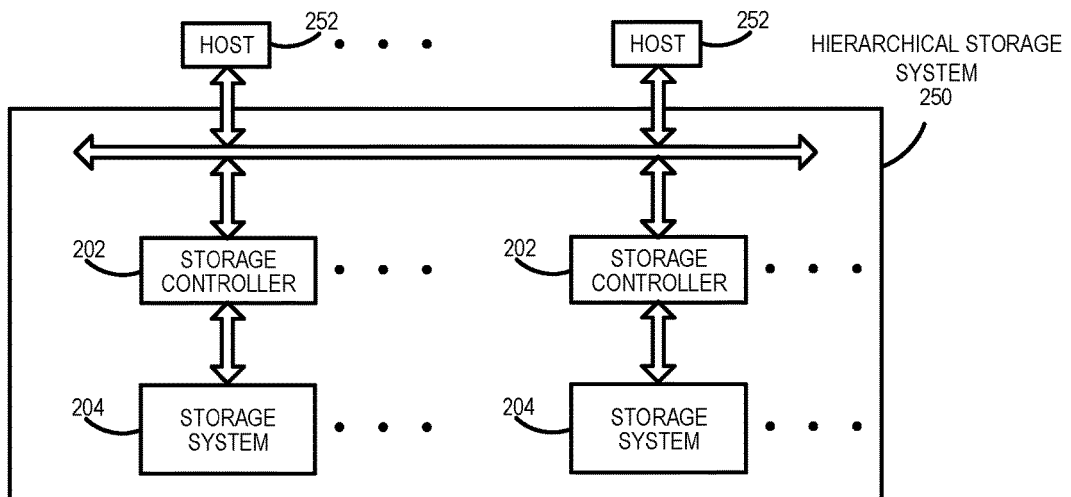
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
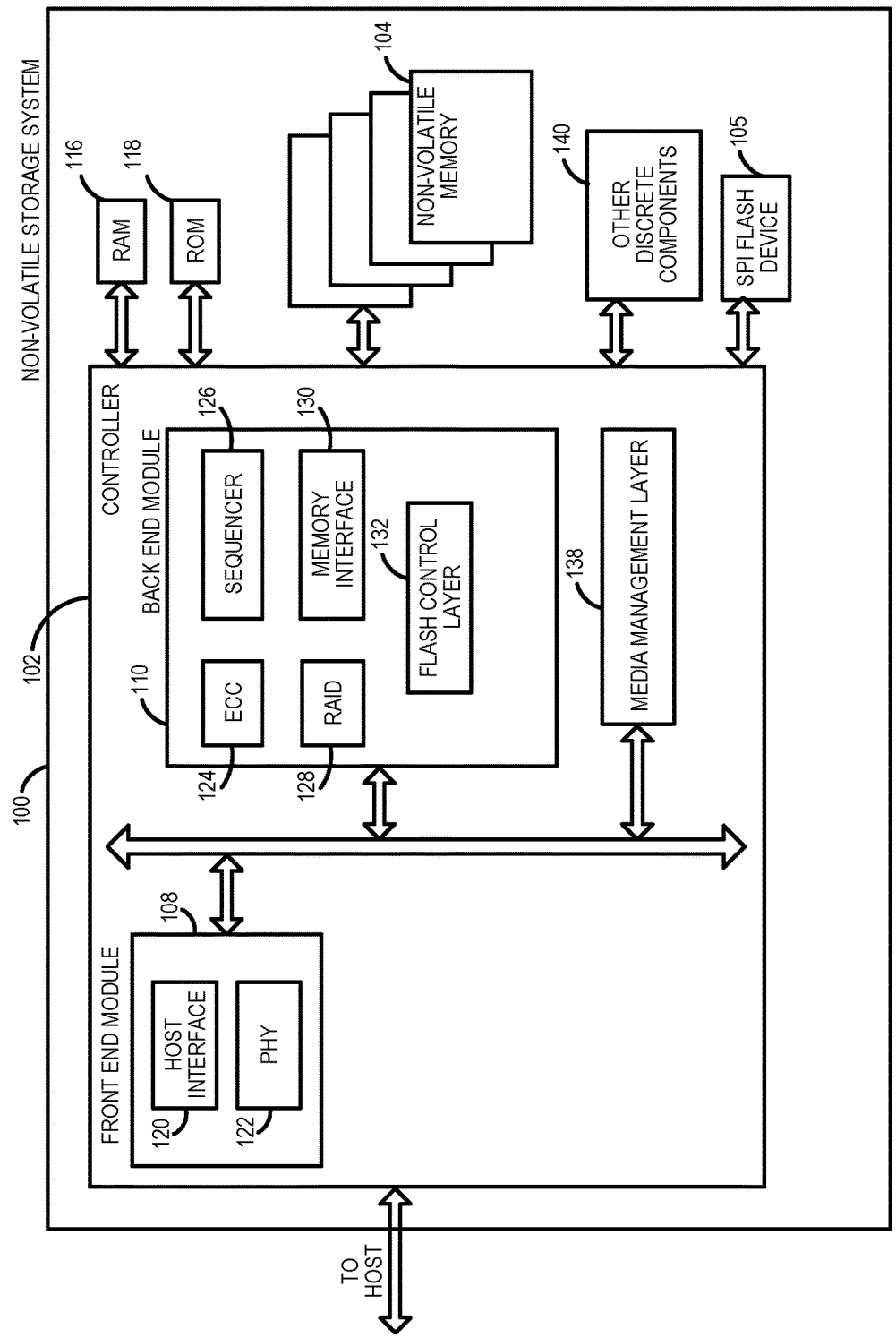
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro) processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

As also shown in FIG. 2A, in one embodiment, the data storage device 100 comprises another non-volatile memory (e.g., a Serial Peripheral Interface (SPI) flash memory device 105, although other types of memory can be used), which is separate from the non-volatile (e.g., flash) mass storage memory 104 and also separate from the controller 102. The SPI flash memory device 105 can contain a substantially-smaller amount of storage space compared to the mass storage memory 104 and can be used to store firmware. In one embodiment, the SPI flash memory device 105 takes the form of an SPI ROM bootloader.

Figure 2B:
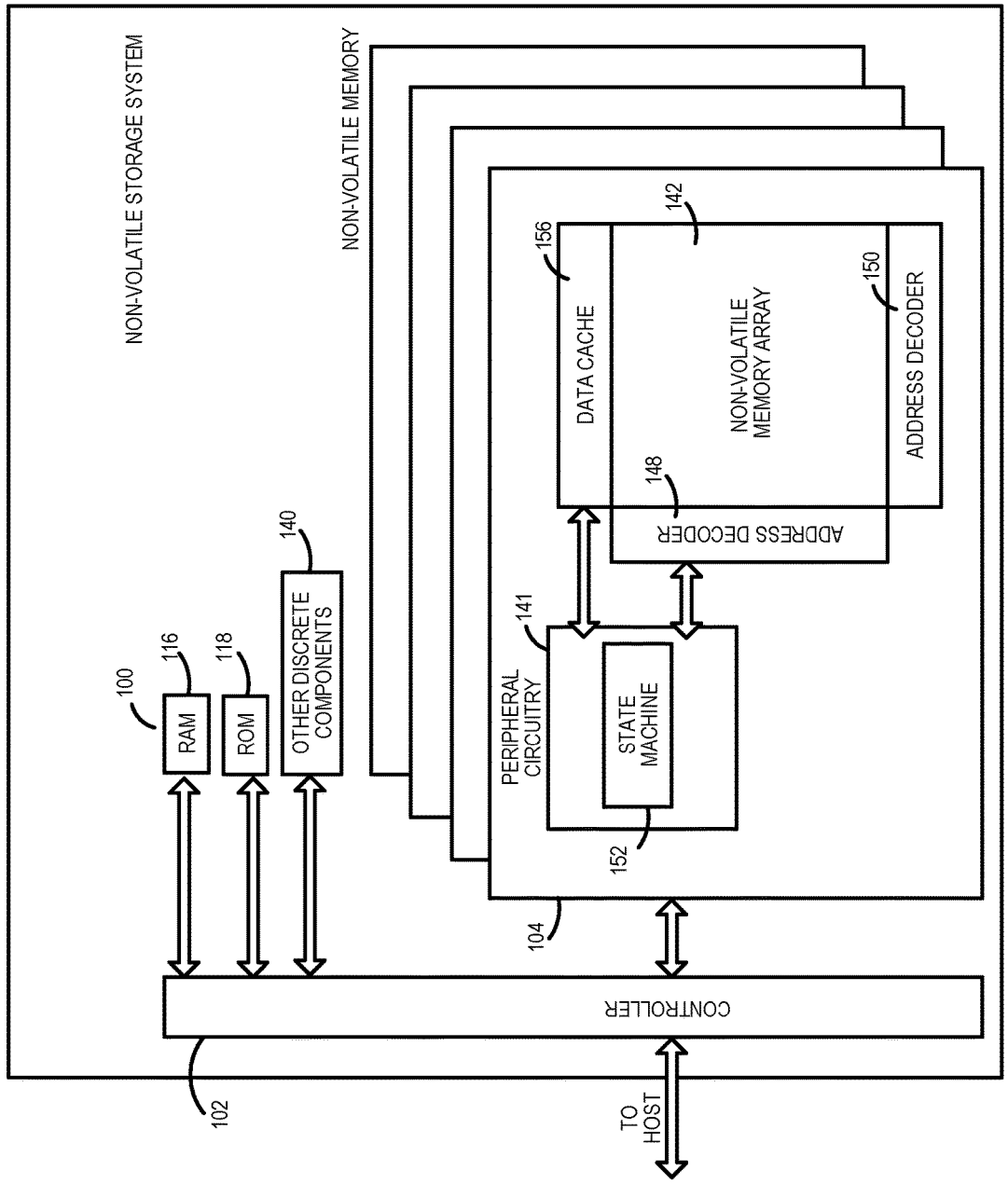
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
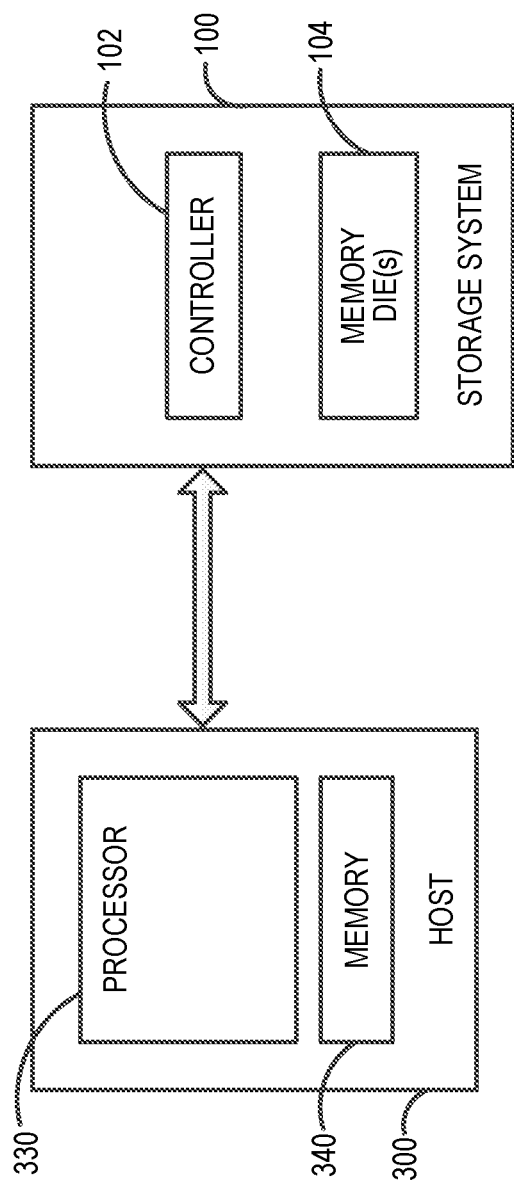
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

In recent decades, there has been an exponential growth in data due to the invention of smart devices, increased network capabilities, social media exposure, etc. This, in-turn, increased the demand for data storage devices to store massive amounts of data generated each day. As stored data can be used by various applications to perform their tasks, it is desired to keep the data highly available for the applications. Any data unavailability issue can cause severe repercussions now more so than ever before.

In order to avoid data unavailability issues, it is desired to upgrade data storage devices in a timely manner with the latest firmware to get improved performance and bug-free operation. In earlier days, data center administrators scheduled a pre-planned window for upgrading data storage devices and validated the upgrade before it was used by end users. Nowadays, it is desired to have data storage devices available almost all the time, and users expect firmware updates to happen seamlessly in the production environment itself.

A firmware upgrade is a critical process that keeps data storage devices updated with all latest bug fixes, thus ensuring data protection and availability. Any mistakes in this process can result in data loss, corruption, and even unavailability of data. Thus, it is desired to protect the end-to-end firmware update process from any security attacks especially when it happens in the production environment.

One major loophole in the firmware update process in data storage devices that do not support secure boot or signed firmware image is that the Serial Peripheral Interface (SPI) flash region for firmware image partitions will be decided and fixed at the very beginning of its design. Storage devices like "just a bunch of drives (JBODs)," "just a bunch of flash (JBOFs)," PCIe bridge cards for storage arrays, and Internet of Thing (IoT) devices currently do not have support for secured firmware updates. This fixed image partition will never change in the entire life cycle of a given data storage device. This means that if the firmware image partition's location is compromised for some reason, it would pave way for an attacker to corrupt the original firmware image with a fake image and cause a disturbance to the entire firmware update process, which can eventually cause downtime and data unavailability.

In face of any attack during the firmware download process that compromises the SPI flash region address, the attacker can even download a corrupted firmware binary image with a similar name and size as the original firmware image, which can result in "bricking" the data storage device (i.e., making it unusable). The following embodiments can be used to address the problem of storing a downloaded firmware image in a default SPI flash address allocated during device manufacturing in devices that do not support secured firmware updates.

In a data storage device, a firmware upgrade is usually performed in two phases (a firmware download phase and a firmware activation phase), and firmware download and firmware commit commands are used. A firmware download command is sent from the host 300 with the binary file to download the given firmware image to the predefined well-known SPI flash address location. The firmware commit command performs binary validation and activates the downloaded binary on the data storage device 100. In the firmware download phase, the binary file to be activated is downloaded in a fixed image partition in the SPI flash region allocated initially during device design. In the second phase of firmware upgrade, the commit command performs validation and stores the binary image after successful activation. This problem is seen in various devices other than data storage devices (such as in IoT devices) where a controller has a small externally-accessible SPI flash chip used to hold firmware.

Figure 4:
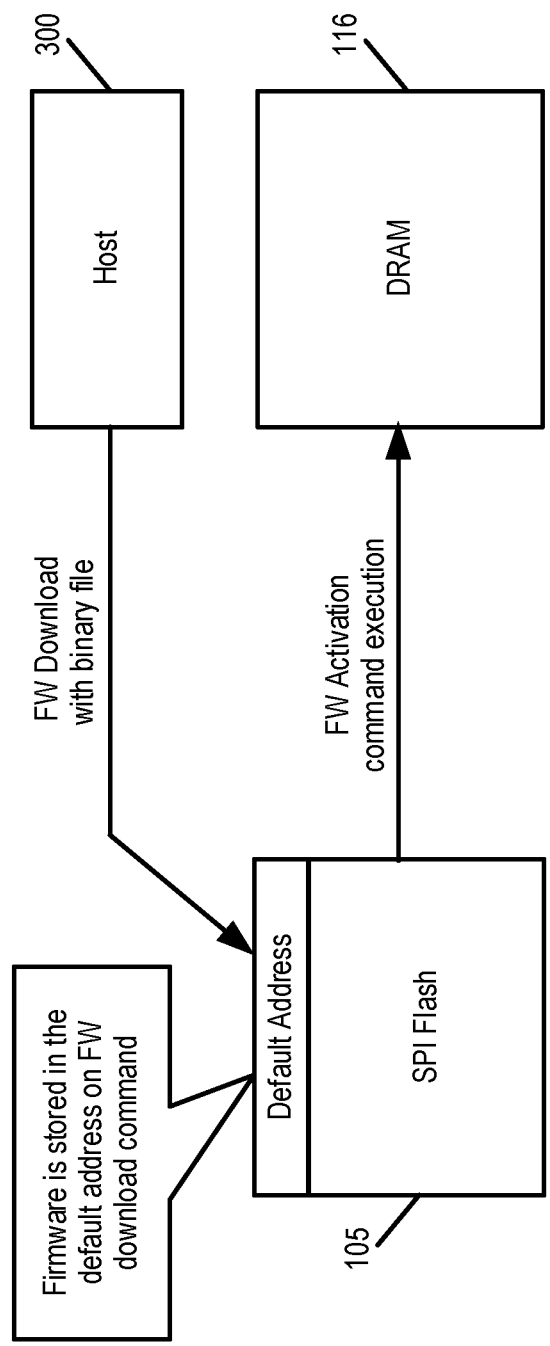
FIG. 4 is a block diagram that illustrates an example firmware update process of an embodiment.
Figure 5:
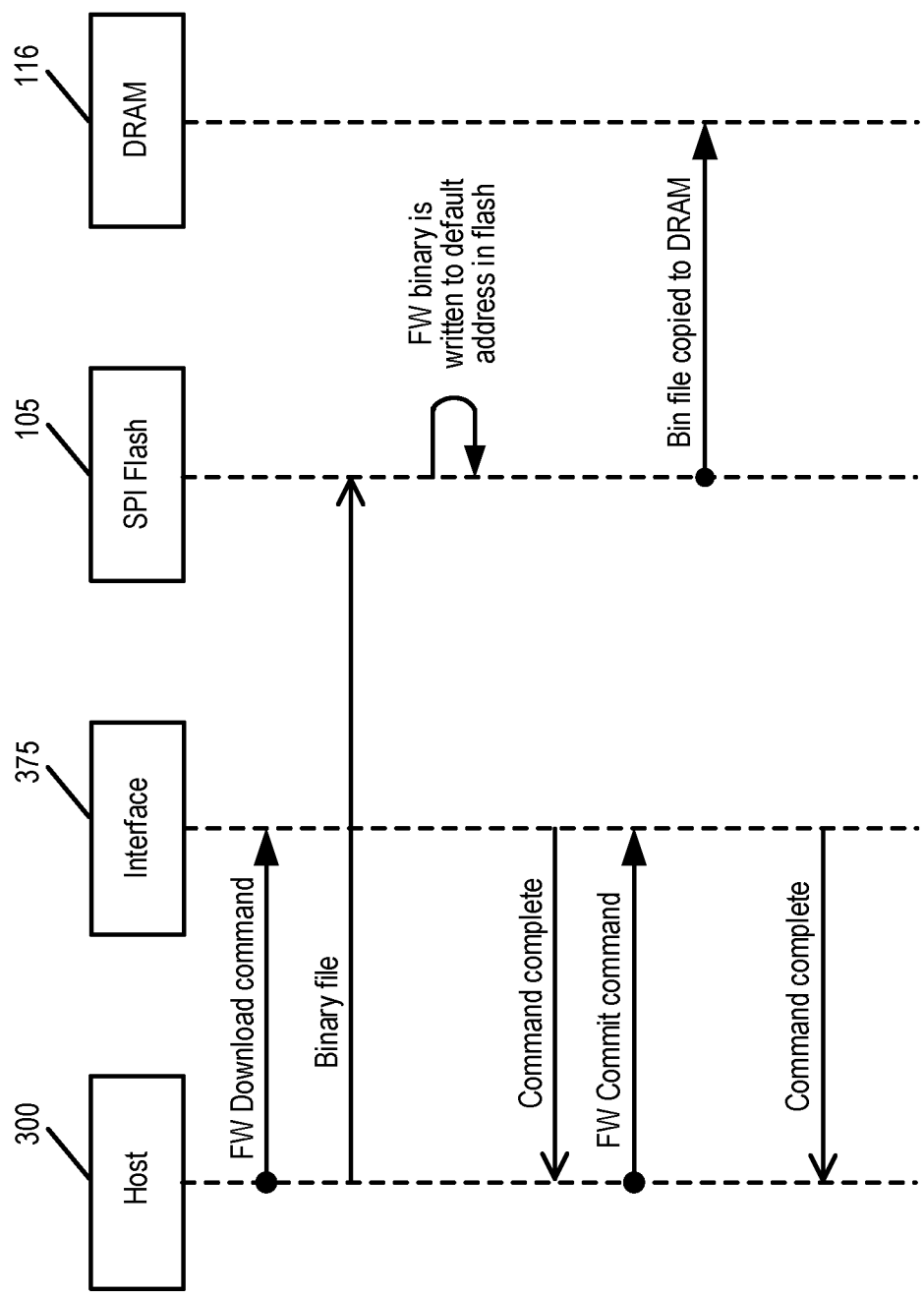
FIG. 5 is a flow diagram that illustrates an example firmware update process of an embodiment.

FIGS. 4 and 5 are illustrate an example firmware update process of an embodiment. FIG. 4 show the host 300, as well as the SPI flash device 105 and DRAM 410, both of which are located in the data storage device 100. During a firmware download, a binary file is downloaded to a well-known address in SPI flash region allocated during the data storage device design, and this address is fixed throughout its lifetime. This is a threat to device security as an attacker can gain access to this fixed SPI flash address of binary download.

FIG. 5 is a flow diagram that illustrates this process. As shown in FIG. 5, the host 300 sends a firmware download command with the firmware binary file. The command is received by an interface 375 in the data storage device 100, and command validation is performed (the interface 375 can be part of or separate from the controller 102) to perform this and other tasks). For a valid command, the binary file is copied into the image partition allocated in the well-known predefined SPI flash address during device manufacturing. As mentioned above, downloading the binary file to this well-known predefined SPI flash address can make the binary file vulnerable to security attacks. After copying the binary file into the default SPI flash address, a command completion message is sent. The host 300 then sends a firmware activate command, and the binary ("bin") file the SPI flash 105 is copied into a region in the DRAM 116. This command then performs binary image validation. After successful activation of the binary file, a completion message is sent, and the firmware images are stored in the SPI flash 105 until the next firmware download occurs.

FIG. 6 is an illustration of the layout of the SPI flash 105 in this example. This diagram indicates that the SPI flash address storing the firmware image after the download process is predetermined. This image partition of the SPI flash address is fixed in the very initial phase of device architecture designing. So, the address remains unchanged during the device lifespan, and it is fixed across products built under the same architecture. Since firmware size is known and fixed, the "SPI flash region size" can also be pre-determined. Thus, an attacker gaining access to this SPI flash address can download a similar firmware binary file with the same size as existing binary files because the firmware image size will be fixed most of the time. This binary file, when activated, can fail at times as an invalid image or even get activated on the data storage device leading to device unavailability and loss of accessibility to intact data. Further, the attack can corrupt previous firmware images and block the data storage device from rolling back to known good previous or fallback images. In several cases, attackers can corrupt all firmware images stored in well-known regions of the SPI flash 125 once it is compromised.

The attacker getting a single device's SPI flash address can destroy the security of multiple devices of the same architecture. For example, in data storage devices such as OpenFlex Data24, Ultrastar Data102, Ultrastar Data60, the compromise of the SPI Flash address can result in huge data loss because of the volumes of data these JBODs and JBOFs currently store in customer environments. A simple compromise of a firmware image flash location in SPI flash can become a multifold attack. This is a major security threat to almost all devices that are latest in the market, as JBODs and JBOFs can become a victim to vulnerable attacks. Recent approaches to address this problem in solid state drives (SSDs), such as secure firmware updates, may not be applicable to these devices. Thus, this is a security threat to the storage devices in the production and customer environments. The attacker can destroy several devices in the field, and this can lead to serious problems where customers can lose basic access to stored data. To fix this problem and recover the data from device, the device can be returned to the manufacturer, but this is can be a costly and cumbersome process.

The following embodiments can be used to overcome this problem. In one embodiment, a technique referred to as "Dynamic Floating Flash Regions (DFFR)" can be used to store binary images (of a firmware update or even of originally-stored firmware) in the SPI flash 105. This technique can prevent an attacker from accessing or downloading a corrupted image to a predetermined location in the SPI flash 125, as there will not be a predefined SPI flash location to hold firmware images using the DFFR technique. Also, alternative methods can be used to improve firmware download security by enhancing binary image storage in the SPI flash chip 105 by storing the firmware image in a more-secured read-only SPI flash region and storing a firmware image redundantly in multiple different SPI flash chips.

Figure 7:
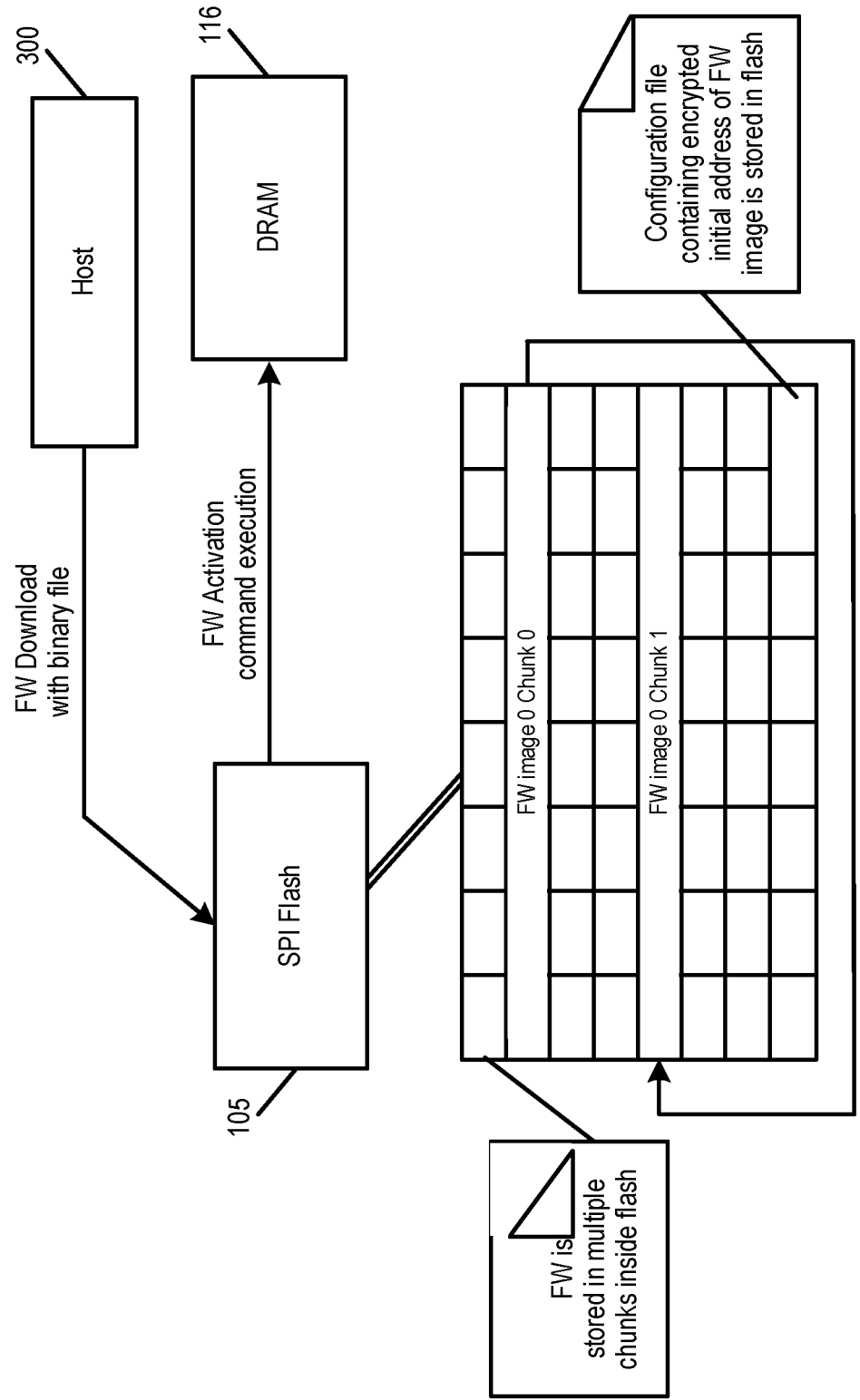
FIG. 7 is an illustration of a dynamic floating flash region technique of an embodiment.

In general, in one embodiment, with the DFFR technique, SPI flash addresses are allocated on the fly to store firmware images for every "firmware download" command (as noted above, these embodiments can be used to store the initial version of the firmware and/or a firmware update). This can involve storing the binary image in various portions ("chunks") in different SPI flash addresses, which can be determined by an algorithm. The address of the initial chunk can be stored in a configuration file, and the addresses of the remaining chunks can be accessed from the previous firmware chunk. In this way, the chunks are stored in a linked fashion. The configuration file that stores the initial address of the firmware image can contain an encrypted SPI flash address. This method is more secured than the methods discussed above as the address of the firmware image can be read only by the user, and it can be inaccessible to an attacker. This method is illustrated in FIG. 7. This approach ensures a secured firmware download to the SPI flash region 105 as the initial address is decided dynamically and stored in an encrypted format instead of the vulnerable process of using a fixed SPI flash region address.

In this embodiment, the firmware binary is sent with the firmware download command. The binary file is divided into "n" number of chunks, where n is limited to a particular value based on the SPI memory's total size and layout. Then, the blocks to store the chunks are allocated dynamically from different SPI flash chunks based on availability. The initial chunk's address is stored in a configuration file after encryption with an encryption key (e.g., stored in ROM in the data storage device 100). The subsequent address of the following chunks is stored internally in the previous firmware chunks. The firmware image is stored in linked list type of data structure. If there are multiple different SPI flash chips available, then the chunks can be distributed across these chips, which makes it more protective.

Figure 8:
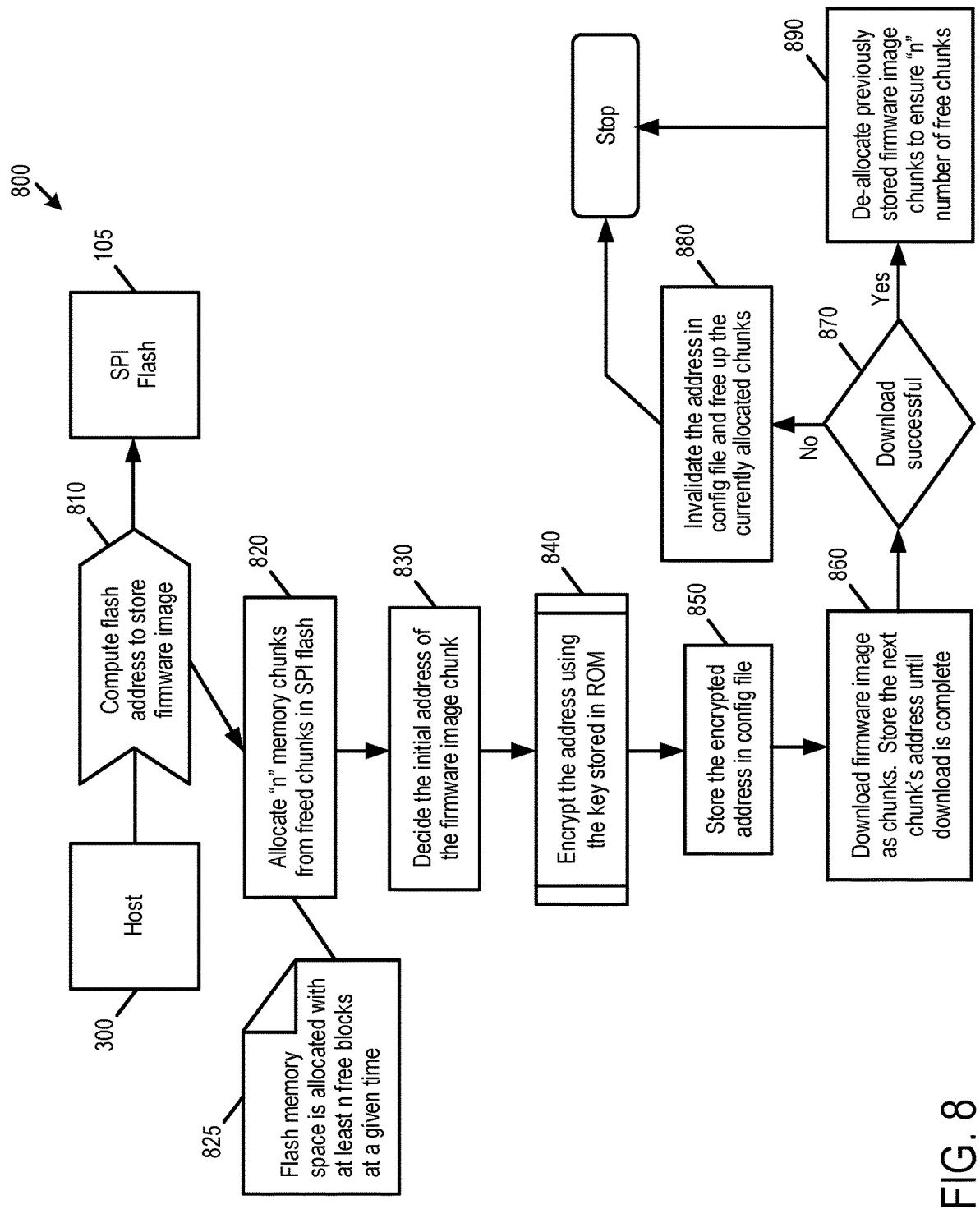
FIG. 8 is a flow chart of a dynamic floating flash region technique of an embodiment.

FIG. 8 is a flow chart 800 that illustrates this process in more detail. As shown in FIG. 8, the host 300 sends a "firmware download" command to the data storage device 100, and the controller 102 computes the address in the SPI flash device 105 to store the firmware image (act 810). Next, "n" memory chunks are allocated (acts 820 and 825). Then, the initial address for the firmware image chunk is decided (act 830). The address is then encrypted using a key (e.g., stored in ROM) (act 840), and the encrypted address is stored in a configuration file (act 850). The firmware image is then downloaded in chunks, and the next chunk's address is stored until the down is complete (act 860). A determination is then made as to whether the download was successful (act 870). If the download was not successful, the address in the configuration file is invalidated, and the currently-allocated chunks are freed (act 880). However, if the download was successful, the previously-stored firmware image chunks are deallocated to ensure "n" number of free chunks (act 890).

The following is an example of pseudo code to compute the initial SPI flash address for a firmware image download. In this example, the SPI flash region for storing multiple firmware images and firmware binary image size is fixed. It should be noted that this is merely an example, and the details presented herein should not be read into the claims unless expressly recited therein.

Begin
1. Generate random number "n" where n is the SPI flash chunk size. "n" is a factor of 2.
2. Divide total size of firmware in "n" chunk size to get "m" free blocks required, where m=firmware binary image size/n
3. Ensure "m" number of free blocks are available.
4. If there are "m" free blocks, (a) get the initial free block address from the pool of free blocks, (b) encrypt the address and store it in the configuration table, and (c) store the "m−1" block addresses in the previous blocks of firmware image chunks.
5. Else free the initially-stored firmware image blocks and follow steps in "4".
6. If download is successful, deallocate initially-stored firmware image to ensure enough free blocks for upcoming firmware download binary.
7. Else if download is unsuccessful, (a) deallocate the blocks where the firmware image is stored and free them, and (b) invalidate the initial address stored in the configuration table.
End The following are example illustrations to denote the working of the pseudo code. In one example, the SPI flash chip size is 1 GB, and the SPI flash region has 200 MB allocated for firmware image storage. The firmware image binary is fixed in size (e.g., 1 MB)

Begin
1. Random number generates SPI flash chunk size as 4 (4 is a factor of 2).
2. Number of free blocks required is calculated as: m=1 MB/4=256 KB
3. Four SPI flash chunks, each of size 256 KB is used.
4. Get the initial free block address, and store the SPI flash address after encryption in the configuration table stored in ROM.
5. Store the subsequent three blocks of firmware image in the available blocks.
6. The address of next blocks is stored in the current blocks (along with the firmware image chunk) in linked fashion.
7. If the firmware download is successful and there is less than 5 MB of free block space, deallocate the first stored binary image and move the blocks to the pool of free blocks.
End In a second example, the SPI flash chip size is 500 MB, and a SPI flash region of 100 MB is allocated for firmware image storage. The firmware image binary is fixed in size (e.g., 1 MB).

Figure 9:
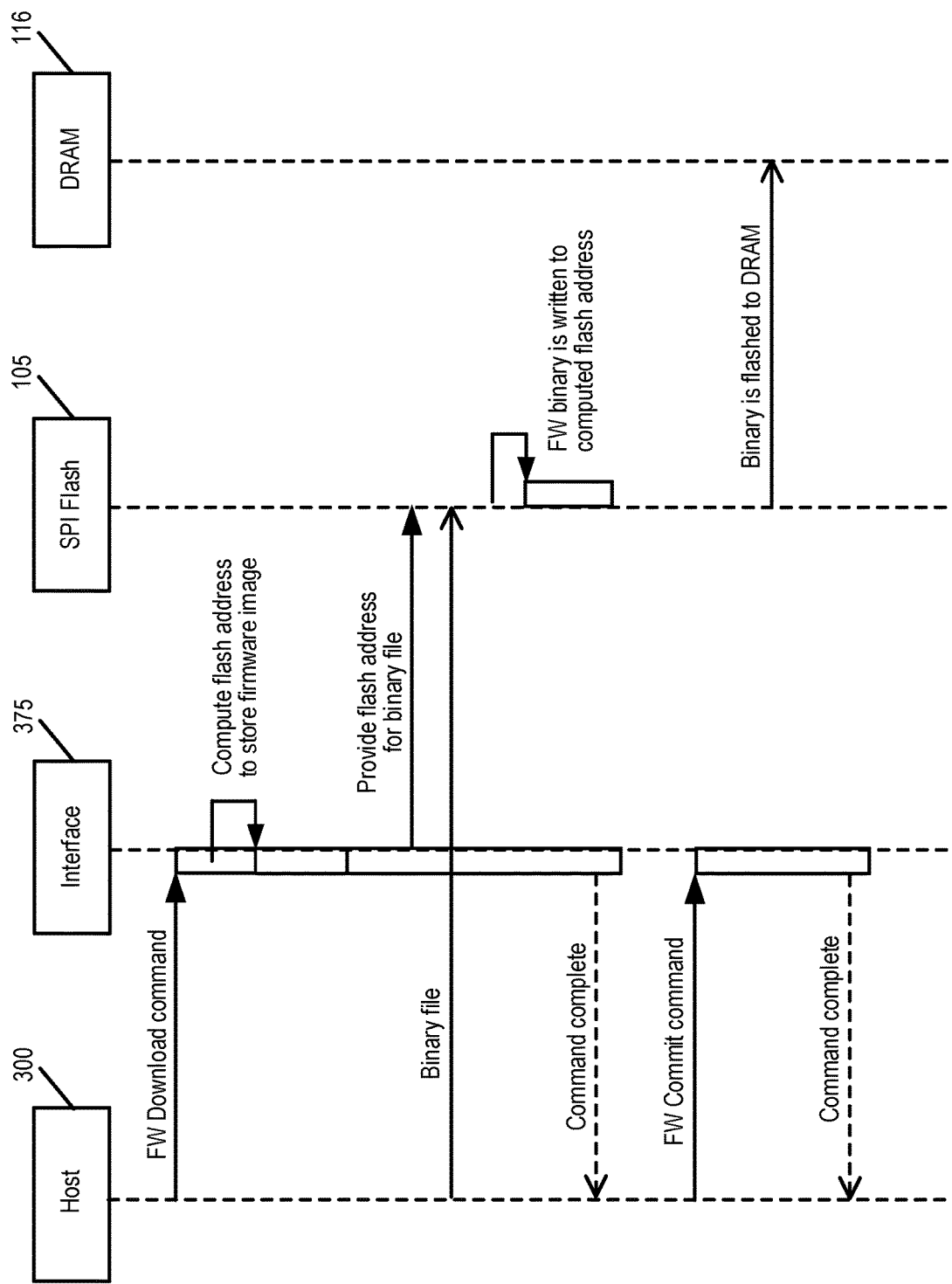
FIG. 9 is a flow diagram that illustrates an example firmware update process of an embodiment.

Begin
1. Random number generates SPI flash chunk size as 3 (3 is a not a factor of 2), so regenerate.
2. Random number generates SPI flash chunk size as 8 (8 is a factor of 2)
3. Number of free blocks required is calculated as: m=1 MB/8=128 KB
4. Eight SPI flash chunks each of size 128 KB are used.
5. Get the initial free block address, if there are not enough free blocks, deallocate blocks from the initially-stored firmware image in the configuration table.
6. Store the initial SPI flash address after encryption in the configuration table stored in ROM.
7. Store the subsequent seven blocks of firmware image in the available blocks.
8. The address of next blocks is stored in the current blocks (along with the firmware image chunk) in linked fashion.
9. If the firmware download is unsuccessful, free up all eight blocks and move them to a free block pool.
10. Remove the initial address of the firmware image from the configuration table.
End With reference to the flow diagram in FIG. 9, in one embodiment, the host 300 sends a firmware download command with the firmware binary file. The command is received by the interface 375, and command validation is performed. For a valid command, the binary file is copied into the SPI flash address computed using the above algorithm. The chunks are stored in different SPI flash addresses, and the initial address of the firmware image is stored in a configuration file after encryption. After copying the binary file into the SPI flash 104, a command completion message is sent. The host 300 then sends a firmware activate command, and the binary file from the SPI flash 105 is stored in the DRAM region 116 after decrypting the address from configuration file. The key for decryption is stored in the secured ROM region, and the binary image validation is performed. After successful activation of the binary, a command complete message is sent, and the firmware images are stored in SPI flash 105 until the next firmware download occurs.

There are several advantages associated with these embodiments. For example, with these embodiments, the firmware upgrade process is more secure by preventing access to attackers to the firmware's location in SPI flash memory. Also, these embodiments can eliminate the cost of returning a device to the manufacture due to a firmware upgrade security attack. Further, firmware devices that do not support secure firmware download and signed firmware features can implement this idea as a firmware feature.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a first non-volatile memory;
   a second non-volatile memory; and
   a processor configured to communicate with the first and second non-volatile memories and further configured to:
      receive, from a host, a firmware download command and a firmware update;
      divide the firmware update into a number of portions, wherein the number of portions depends on a size and/or a layout of the second non-volatile memory;
      determine whether there is available free memory space in the second non-volatile memory to store the portions of the firmware update; and
      in response to determining that there is available free memory space in the second non-volatile memory to store the portions of the firmware update:
         determine addresses in the second non-volatile memory to store the portions of the firmware update, wherein the addresses are determined on-the-fly as opposed to being predetermined;
         store the portions of the firmware update in the addresses in the second non-volatile memory; and
         store an encrypted version of an address of a first portion of the firmware update in a configuration file;
         wherein the portions of the firmware update are stored in a linked fashion such that an address of a given portion of the firmware update is stored in a previous portion of the firmware update.

2. The data storage device of claim 1, wherein the processor is further configured to:
   determine whether the firmware update was successfully stored; and
   in response to determining that the firmware update was successfully stored, deallocate locations in the second non-volatile memory that store a previous firmware version.

3. The data storage device of claim 2, wherein the processor is further configured to;
   in response to determining that the firmware update was not successfully stored, deallocate locations in the second non-volatile memory that were allocated to store the firmware update and invalidate the encrypted version of the address of the first portion of the firmware update stored in the configuration file.

4. The data storage device of claim 1, wherein a storage capacity of the second non-volatile memory is less than a storage capacity of the first non-volatile memory.

5. The data storage device of claim 1, wherein the second non-volatile memory comprises a Serial Peripheral Interface (SPI) flash memory device.

6. The data storage device of claim 1, wherein the first non-volatile memory comprises a three-dimensional memory.

7. A method comprising:
   performing in a data storage device comprising a first non-volatile memory and a second non-volatile memory:
      receiving, from a host, a firmware download command and a firmware update;
      dividing the firmware update into a number of portions, wherein the number of portions depends on a size and/or a layout of the second non-volatile memory;
      determining whether there is available free memory space in the second non-volatile memory to store the portions of the firmware update; and in response to determining that there is available free memory space in the second non-volatile memory to store the portions of the firmware update:
  determining addresses in the second non-volatile memory to store the portions of the firmware update, wherein the addresses are determined on-the-fly as opposed to being predetermined;
  storing the portions of the firmware update in the addresses in the second non-volatile memory; and
  storing an encrypted version of an address of a first portion of the firmware update in a configuration file;
wherein the portions of the firmware update are stored in a linked fashion such that an address of a given portion of the firmware update is stored in a previous portion of the firmware update.

8. The method of claim 7, further comprising:
determining whether the firmware was successfully stored; and
in response to determining that the firmware was successfully stored, deallocating locations in the second non-volatile memory that store a previous firmware version.

9. The method of claim 8, further comprising:
in response to determining that the firmware was not successfully stored, deallocating locations in the second non-volatile memory that were allocated to store the firmware and invalidating the encrypted version of the address of the first portion of the firmware update stored in the configuration file.

10. The method of claim 7, wherein a storage capacity of the second non-volatile memory is less than a storage capacity of the first non-volatile memory.

11. The method of claim 7, wherein the second non-volatile memory comprises a Serial Peripheral Interface (SPI) flash memory device.

12. A data storage device comprising:
a first non-volatile memory;
a second non-volatile memory; and
means for:
  receiving, from a host, a firmware download command and a firmware update;
  dividing the firmware update into a number of portions, wherein the number of portions depends on a size and/or a layout of the second non-volatile memory;
  determining whether there is available free memory space in the second non-volatile memory to store the portions of the firmware update; and
  in response to determining that there is available free memory space in the second non-volatile memory to store the portions of the firmware update:
    determining addresses in the second non-volatile memory to store the portions of the firmware update, wherein the addresses are determined on-the-fly as opposed to being predetermined;
    storing the portions of the firmware update in the addresses in the second non-volatile memory; and
    storing an encrypted version of an address of a first portion of the firmware update in a configuration file;
  wherein the portions of the firmware update are stored in a linked fashion such that an address of a given portion of the firmware update is stored in a previous portion of the firmware update.

13. The data storage device of claim 1, wherein the number of portions depends on the size of the second non-volatile memory.

14. The data storage device of claim 1, wherein the number of portions depends on the layout of the second non-volatile memory.

15. The data storage device of claim 1, wherein the number of portions depends on both the size and the layout of the second non-volatile memory.

16. The method of claim 7, wherein the number of portions depends on the size of the second non-volatile memory.

17. The method of claim 7, wherein the number of portions depends on the layout of the second non-volatile memory.

18. The method of claim 7, wherein the number of portions depends on both the size and the layout of the second non-volatile memory.

* * * * *